US006847506B1

United States Patent
Lin et al.

(10) Patent No.: US 6,847,506 B1
(45) Date of Patent: Jan. 25, 2005

(54) ACTUATOR FOR USE WITH A DISK DRIVE HAVING A COIL ASSEMBLY DESIGNED TO AID IN HEAT CONVECTION FROM THE COIL OF THE COIL ASSEMBLY

(75) Inventors: Chen-Chi Lin, San Jose, CA (US); Richard G. Krum, Thousand Oaks, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 161 days.

(21) Appl. No.: 10/377,572

(22) Filed: Feb. 28, 2003

(51) Int. Cl.⁷ .............................................. G11B 5/55
(52) U.S. Cl. ..................................................... 360/265.8
(58) Field of Search ............................. 360/265.8, 265

(56) References Cited

U.S. PATENT DOCUMENTS 6,078,477 A * 6/2000 Adams et al. ............ 360/265.8
6,181,530 B1 * 1/2001 Ratliff et al. ............ 360/265.8
6,480,364 B1 * 11/2002 Thanomsat et al. ...... 360/265.8
6,600,633 B2 * 7/2003 Macpherson et al. .... 360/265.8

* cited by examiner

*Primary Examiner*—Robert S. Tupper
(74) *Attorney, Agent, or Firm*—Milad G. Shara, Esq.; Won Tae C. Kim, Esq.; Blakely, Sokoloff, Taylor & Zafman

(57) ABSTRACT

Disclosed is an actuator for use with a disk drive having a coil assembly designed to aid in heat convection from the coil of the coil assembly. The actuator includes a body portion for pivotally coupling to the disk drive and an actuator arm cantilevered from the body portion for supporting a head gimbal assembly (HGA). The actuator further includes a coil assembly having a coil and a fork. The fork is cantilevered from the body portion in an opposite direction from the actuator arm and includes a pair of opposed prongs to mount the coil. At least one of the prongs of the fork includes at least two opposed fins to aid in the convection of heat from the coil.

36 Claims, 6 Drawing Sheets

ACTUATOR FOR USE WITH A DISK DRIVE HAVING A COIL ASSEMBLY DESIGNED TO AID IN HEAT CONVECTION FROM THE COIL OF THE COIL ASSEMBLY

BACKGROUND OF THE INVENTION

1. Field of the Invention

The present invention relates to an actuator for use with a disk drive. More particularly, the present invention relates to an actuator for use with a disk drive having a coil assembly designed to aid in heat convection from the coil of the coil assembly.

2. Description of the Prior Art and Related Information

A huge market exists for hard disk drives for mass-market host computer systems such as servers, desktop computers, and laptop computers. To be competitive in this market, a hard disk drive should be relatively inexpensive, and should accordingly embody a design that is adapted for low-cost mass production. Further, there exists substantial competitive pressure to continually develop hard disk drives that have increasingly higher storage capacity, that provide for faster access to data, and at the same time conform to decreasingly smaller exterior sizes and shapes often referred to as "form factors."

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly which may include the pivot bearing cartridge. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of arms projecting parallel to each other and perpendicular to the axis of the bore. The prefabricated head stack assembly also includes head gimbal assemblies that are supported by the arms. Each head gimbal assembly includes a load beam and a head supported by the load beam. The head is positioned over a track on a recording surface of the disk to write or read data to or from the track.

Typically, the body portion and the arms of the head stack assembly are made out of metal and form a unitary structure known as an "E-block." The E-block may include any number of arms, e.g., one, two, three, four, five, six, etc. However, these types of head stack assemblies tend to have a relatively high mass since the entire unitary structure of the E-block is typically made out of metal. This relatively high mass results in a corresponding high moment of inertia about the pivot axis of the head stack assembly. Because of this high moment of inertia, in order to pivot the head of the head stack assembly to access data from the disk, a relatively large access time is required for the given amount of power applied to the coil.

Because of the competitive pressure to continually develop hard disk drives that provide for faster access to data, techniques are continuously being developed to decrease the access time to data. One potential technique to accomplish this is by increasing the speed at which the head stack assembly is pivoted to position the head over a track of the disk in order to access data. Unfortunately, the faster that the head stack assembly is to be moved to position the head, increased power is likewise required to be applied to the coil of the coil assembly in order to move the head of the head stack assembly at the faster rate, which further results in ever increasing temperatures of the body portion and the arms of the head stack assembly. If the temperatures of the body portion and the arms of the head stack assembly increase too much, the internal components of the hard disk drive (including the head stack assembly itself may be damaged. Furthermore, the increased temperatures may cause the resonant frequencies of the actuator to change such that the overall performance of the disk drive is degraded.

SUMMARY OF THE INVENTION

The present invention relates to an actuator for use with a disk drive. More particularly, the present invention relates to an actuator for use with a disk drive having a coil assembly designed to aid in heat convection from the coil of the coil assembly.

In one aspect, the invention may be regarded as an actuator for use with a disk drive. The actuator includes a body portion for pivotally coupling to the disk drive and an actuator arm cantilevered from the body portion for supporting a head gimbal assembly (HGA). The actuator further includes a coil assembly having a coil and a fork. The fork is cantilevered from the body portion in an opposite direction from the actuator arm and includes a pair of opposed prongs to mount the coil. At least one of the prongs of the fork includes at least two opposed fins to aid in the convection of heat from the coil.

In one embodiment, the actuator may further comprise a sidewall from which the at least two opposed fins project thereby forming a channel-shaped portion to aid in the convection of heat from the coil. Particularly, in one embodiment, the sidewall may extend beyond the at least two opposed fins such that the at least two opposed fins project from an interior portion of the sidewall.

In a more detailed embodiment, the fork may comprise a metallic material. Further, the coil assembly may include a bobbin, which may also be comprised of a metallic material. In one particular embodiment, the bobbin may include at least two opposed fins to aid in the convection of heat from the coil. In one embodiment, the fins of the bobbin may be separated from one another by a spacer. For example, the spacer may be comprised of a plastic material or a ceramic material.

In another embodiment of an actuator for use with a disk drive, the actuator includes a body portion for pivotally coupling to the disk drive and an actuator arm cantilevered from the body portion for supporting a head gimbal assembly (HGA). The actuator further includes a coil assembly having a coil and a fork. The fork is cantilevered from the body portion in an opposite direction from the actuator arm and includes a pair of opposed prongs to mount the coil. At least one of the prongs of the fork includes a plurality of opposed projections that are disposed along the prong to aid in the convection of heat from the coil.

In a more detailed embodiment, the fork may comprise a metallic material. Further, the coil assembly may include a bobbin, which may also be comprised of a metallic material. In one particular embodiment, the bobbin may include at least two opposed fins to aid in the convection of heat from the coil. In one embodiment, the fins of the bobbin may be separated from one another by a spacer. For example, the spacer may be comprised of a plastic material or a ceramic material.

In another aspect, the invention may be regarded as a disk drive. The disk drive includes a disk for rotation within the disk drive and a head stack assembly (HSA). The HSA includes a body portion pivotally coupled to the disk drive and an actuator arm cantilevered from the body portion to support a head gimbal assembly (HGA) having a head for writing and reading data to and from the disk. Further, the disk drive includes a coil assembly having a coil and a fork. The fork is cantilevered from the body portion in an opposite direction from the actuator arm and includes a pair of opposed prongs to mount the coil. At least one of the prongs of the fork includes at least two opposed fins to aid in the convection of heat: from the coil.

In one embodiment, a sidewall may be present from which the at least two opposed fins project to thereby form a channel-shaped portion to aid in the convection of heat from the coil. Particularly, in one embodiment, the sidewall may extend beyond the at least two opposed fins such that the at least two opposed fins project from interior portion of the sidewall.

In a more detailed embodiment, the fork may comprise a metallic material. Further, the coil assembly may include a bobbin, which may also be comprised of a metallic material. In one particular embodiment, the bobbin may include at least two opposed fins to aid in the convection of heat from the coil. In one embodiment, the fins of the bobbin may be separated from one another by a spacer. For example, the spacer may be comprised of a plastic material or a ceramic material.

In another embodiment of the disk drive, the disk drive includes a disk for rotation within the disk drive and a head stack assembly (HSA). The HSA includes a body portion pivotally coupled to the disk drive and an actuator arm cantilevered from the body portion to support a head gimbal assembly (HGA) having a head for writing and reading data to and from the disk. Further, the disk drive includes a coil assembly having a coil and a fork. The fork is cantilevered from the body portion in an opposite direction from the actuator arm and includes a pair of opposed prongs to mount the coil. At least one of the prongs of the fork includes a plurality of opposed projections that are disposed along the prong to aid in the convection of heat from the coil.

In a more detailed embodiment, the fork may comprise a metallic material. Further, the coil assembly may include a bobbin, which may also be comprised of a metallic material. In one particular embodiment, the bobbin may include at least two opposed fins to aid in the convection of heat from the coil. In one embodiment, the fins of the bobbin may be separated from one another by a spacer. For example, the spacer may be comprised of a plastic material or a ceramic material.

The foregoing and other features of the invention are described in detail below and are set forth in the appended claims.

DETAILED DESCRIPTION

The present invention relates to an actuator for use with a disk drive, and more particularly, to an actuator for use with a disk drive having a coil assembly designed to aid in heat convection from the coil of the coil assembly.

Figure 1:
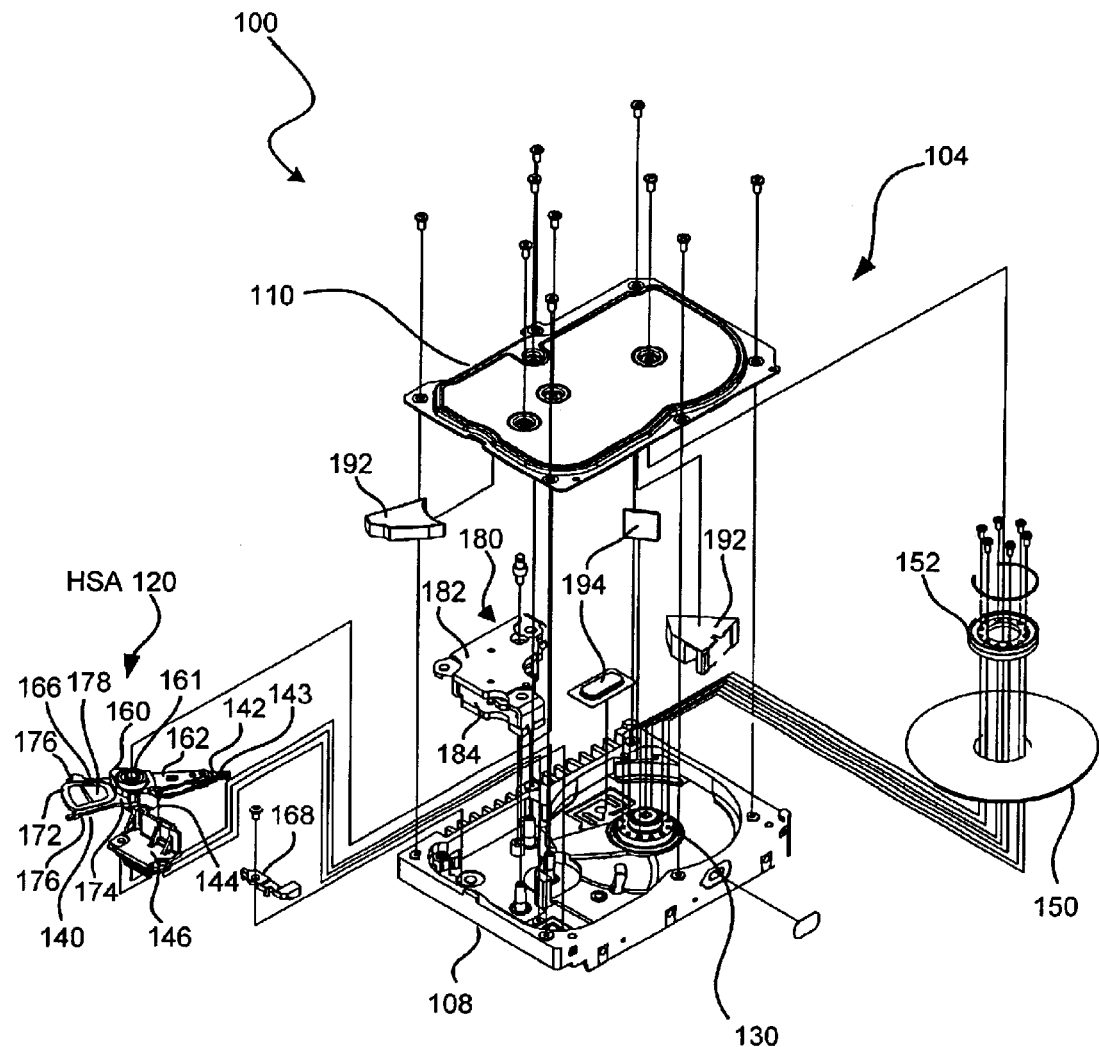
FIG. 1 is an exploded perspective view of a hard disk drive (HDD), which includes an actuator having a coil assembly designed to aid in heat convection from the coil of the coil assembly, according to one embodiment of the invention.

With reference to FIG. 1, FIG. 1 is an exploded perspective view of a hard disk drive (HDD) 100, which includes an actuator having a coil assembly designed to aid in heat convection from the coil of the coil assembly, according to one embodiment of the invention. The disk drive 100 includes a head disk assembly (HDA) 104 and a printed circuit board assembly (PCBA) (not shown). As is known, the PCBA includes circuitry for processing signals and controlling the operations of the disk drive. The HDA 104 includes a base 108 and a separate cover 110 attached to the base 108 to collectively house at least one disk 150, a spindle motor 130 attached to the base 108 for rotating disk 150, a head stack assembly (HSA) 120, and a pivot bearing cartridge 161 (such as a stainless steel pivot bearing cartridge, for example) that rotatably supports the HSA 120 on the base 108. The base 108 is typically attached to the separate cover 110 by means of screws or other discrete fasteners. The disk 150 may be mounted to the spindle motor 130 by a disk clamp 152. The spindle motor 130 rotates the disk 150 at a constant angular velocity about a spindle motor rotation axis. Each disk utilized may include a plurality of recording surfaces for writing or reading data to or from the disk.

The HSA 120 comprises a swing-type or rotary actuator assembly 140, at least one head gimbal assembly (HGA) 142, and a flex circuit cable assembly 144 including a flex circuit cable mounted to the base 108 by a flex circuit assembly bracket 146. The rotary actuator assembly 140 includes a body portion 160 having a pivot bore for receipt of pivot-bearing cartridge 161, at least one actuator arm 162 cantilevered from the body portion 160, and a coil assembly 166 cantilevered from the body portion 160 in an opposite direction from the actuator arm 162. The actuator arm 162 supports the HGA 142 having a load beam 143 that supports a head (not shown) for writing and reading data to and from the disk 150. For example, the head can include an inductive head that is used to both read and write data on a recording surface of the disk 150, or a magnetoresistance (MR) head, which includes an MR head element to read data and an inductive element to write data.

The coil assembly 166 includes a coil 172 and a fork 174. The fork 174 is cantilevered from the body portion 160 in an opposite direction from the actuator arm 162 and includes a pair of opposed prongs 176 to mount the coil 172 and a bobbin 178 therebetween. The coil assembly and bobbin will be discussed in greater detail later.

The HSA 120 is pivotally secured to the base 108 via a pivot-bearing cartridge 161 mounted through the pivot bore of the body portion 160 of the HSA 120 forming a pivot axis such that the head at the distal end of the HGA 142 may be moved over a recording surface of the disk 150. The pivot-bearing cartridge 161 enables the HSA 120 to pivot about the pivot axis. The storage capacity of the HDA 104 may be increased by the use of additional disks and by the HSA 120 having a vertical stack of HGAs supported by multiple actuator arms. Also, a latch 168 may be mounted to the base 108 in order to latch the actuator 140 when the HDD 100 is powered down.

A voice coil motor (VCM) plate assembly 180 including a top and a bottom VCM plate 182 and 184 is also mounted to the base 108. Suitably, one or both of the VCM plates includes a permanent magnet. The coil 172 of the coil assembly 166 of the actuator assembly 140 is disposed between the top and bottom VCM plates 182 and 184 in order to form a voice coil motor to cause the pivoting of the HSA 120 about the pivot axis defined by the pivot bearing cartridge 161. Thus, the voice coil motor can be used to controllably position the head(s) of the HSA relative to the disk for writing and/or reading data. As should be appreciated, multiple disks and HSA's having multiple HGA's and multiple heads may be utilized. The HDD 100 may also include additional features such as airflow diverters 192 and filters 194.

Figure 2:
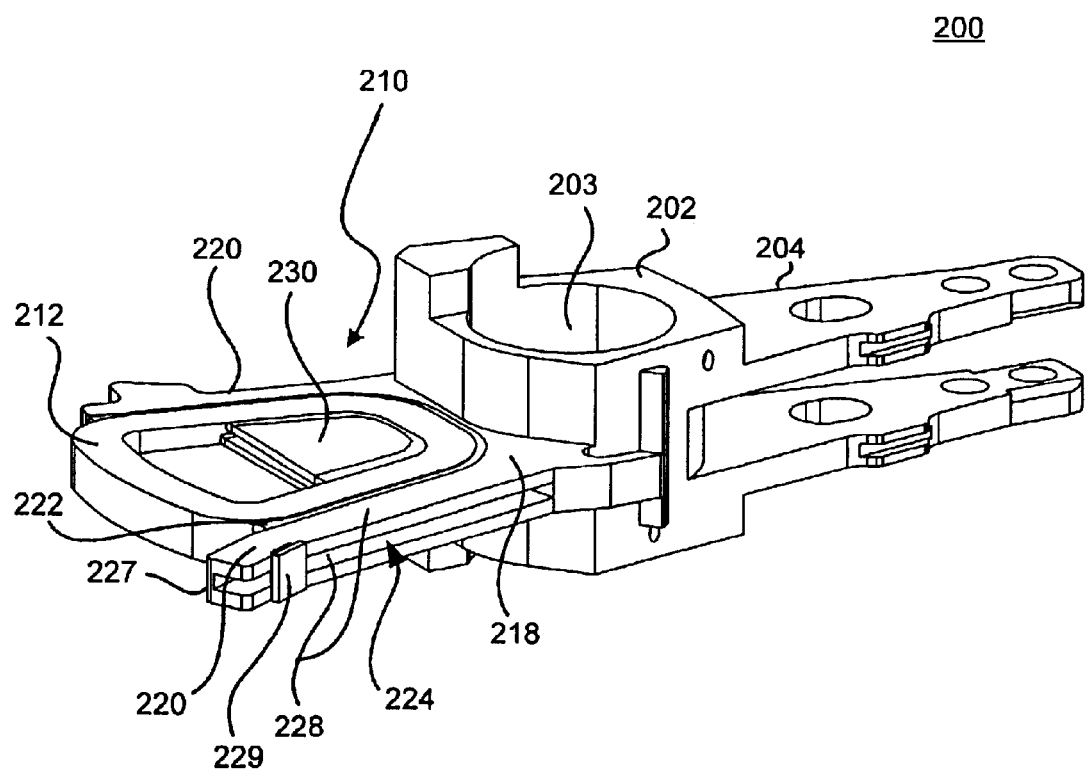
FIG. 2 shows a perspective view of an actuator having a coil assembly designed to aid in heat convection from the coil of the coil assembly, according to one embodiment of the invention.

Turning now to FIG. 2, FIG. 2 shows a perspective view of an actuator 200 having a coil assembly 210 designed to aid in heat convection from the coil of the coil assembly, according to one embodiment of the invention. The actuator 200 is for use with a disk drive, such as the disk drive previously discussed with reference to FIG. 1. The actuator 200 includes a body portion 202 for pivotally coupling to the disk drive and at least one actuator arm 204 cantilevered from the body portion for supporting a HGA (not shown). The body portion 202 includes a pivot bore 203 for receipt of the pivot bearing cartridge that pivotally mounts the actuator 200 and the HSA to the base of the disk drive and further forms a pivot axis about which the HSA can pivot such that the head at the distal end of the HGA may be moved over a recording surface of a disk, as previously discussed with reference FIG. 1.

The actuator 200 further includes a coil assembly 210 having a coil 212 and an approximately U-shaped fork 218. The fork 218 is cantilevered from the body portion 202 in an opposite direction from the actuator arm 204 and includes a pair of opposed prongs 220 that angle slightly outward from the body portion and that mount the coil 212. Particularly, the coil 212 may be mounted to the interior portion of the approximately U-shaped fork 218 between the pair of opposed prongs 220 by a suitable adhesive 222.

At least one of the prongs 220 of the fork 218 includes at least two opposed fins 228 to aid in the convection of heat from the coil 212. As shown in FIG. 2, the fins 228 are approximately rectangular planar structures that angle slightly outward from the body portion 202 to form a prong 220 of the fork 218. It should be appreciated that either one or both of the prongs 220 may have fins 228. In the case, where the prong does not include fins, the prong may be a suitable solid structure. Moreover, it should be appreciated that a prong may include any number of fins to aid in heat convection. Also, a tang 229 may be attached to one of the prongs to interact with a latch of the disk drive in order to latch the actuator of the HSA when the hard disk drive is powered down.

In one embodiment, the prong 220 may include a sidewall 227 from which the at least two opposed fins 228 project thereby forming a channel-shaped portion 224 to aid in the convection of heat from the coil 212. Typically, the fork may comprise a metallic material to aid in the convection of heat from the coil 212. Further, the coil assembly 210 may include a bobbin 230, which may also be comprised of a metallic material. Thus, typically, both the fork 218 and the bobbin 230 may both be comprised of a metallic material to aid in the convection of heat from the coil 212. In one particular embodiment, the bobbin 230 may include at least two opposed fins to aid in the convection of heat from the coil, as will be discussed.

Figure 3:
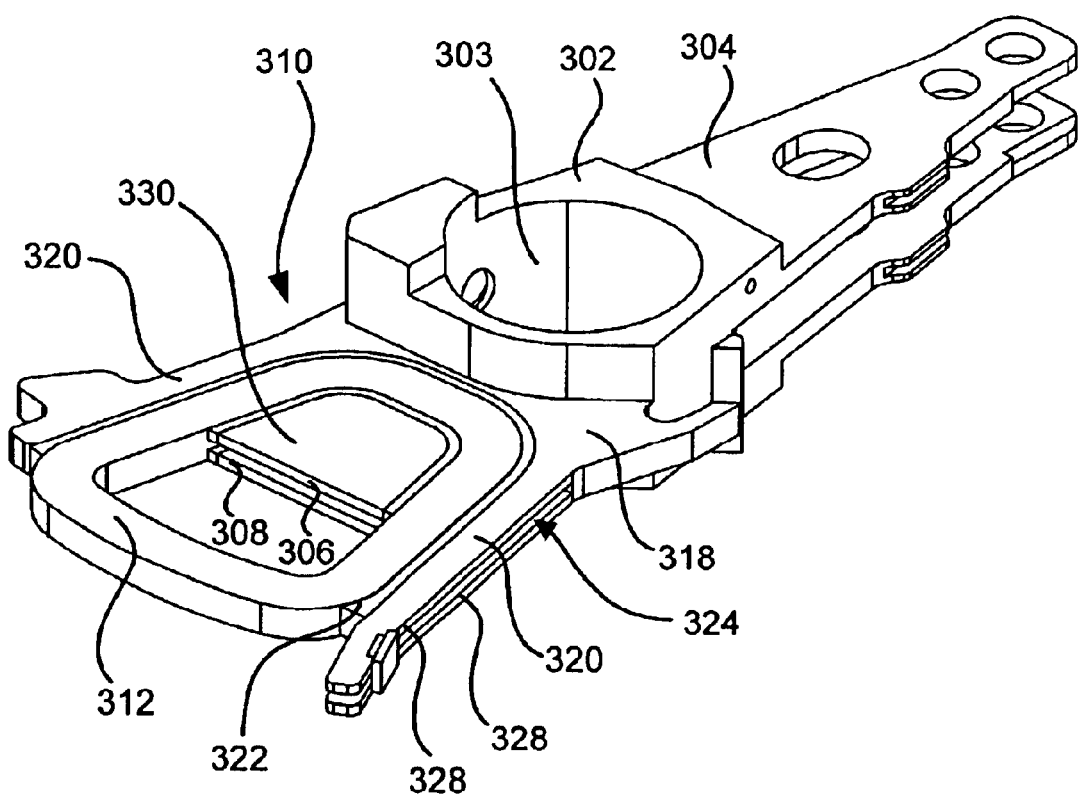
FIG. 3 shows a perspective view of a slightly modified actuator of FIG. 2, and particularly illustrates a bobbin of the coil assembly designed to aid in heat convection from the coil of the coil assembly, according to one embodiment of the invention.

With reference now to FIG. 3, FIG. 3 shows a perspective view of a slightly modified actuator of FIG. 2, and particularly illustrates a bobbin 330 of the coil assembly 310 designed to aid in heat convection from the coil of the coil assembly, according to one embodiment of the invention. The actuator 300 includes a body portion 302 for pivotally coupling to the disk drive and at least one actuator arm 304 cantilevered from the body portion for supporting a head gimbal assembly (HGA) (not shown). The body portion 302 includes a pivot bore 303 for receipt of the pivot bearing cartridge that pivotally mounts the actuator 300 and the HSA to the base of the disk drive and further forms a pivot axis about which the HSA can pivot such that the head at the distal end of the HGA may be moved over a recording surface of a disk, as previously discussed with reference FIG. 1.

The actuator 300 further includes a coil assembly 310 having a coil 312 and an approximately U-shaped fork 318. The fork 318 is cantilevered from the body portion 302 in an opposite direction from the actuator arm 304 and includes a pair of opposed prongs 320 that angle slightly outward from the body portion and that mount the coil 312. Particularly, the coil 312 may be mounted to the interior portion of the approximately U-shaped fork 318 between the pair of opposed prongs 320 by a suitable adhesive 322.

Particularly, as previously discussed with reference to FIG. 2, at least one of the prongs 320 of the fork 318 includes at least two opposed fins 328 to aid in the convection of heat from the coil 312. As shown in FIG. 3, the fins 328 are approximately rectangular planar structures that angle slightly outward from the body portion 302 to form a prong 320 of the fork 318. It should be appreciated that either one or both of the prongs 320 may have fins 328. In the case, where the prong does not include fins, the prong may be a suitable solid structure. In the embodiment of FIG. 2, the prong includes a sidewall 227 from which the at least two opposed fins projected to form a channel-shaped portion to aid in the convection of heat from the coil. However, as shown in FIG. 3, the sidewall is not present. In this instance, the at least two opposed fins 328 form an open approximately channel-shaped portion 324 (without the sidewall) between the two fins to aid in the convection of heat from the coil. It should be appreciated that a prong may include any number of fins to aid in heat convection. Also, as previously discussed, typically, the fork may comprise a metallic material to aid in the convection of heat from the coil 212.

Further, the coil assembly 310 may include a bobbin 330, which may be comprised of a metallic material. In one embodiment, the bobbin 330 may include at least two opposed fins 306 and 308 to aid in the convection of heat from the coil. As can be seen in FIG. 3, the two opposed fins 306 and 308 are approximately fin-shaped members conforming approximately to a portion of the interior shape of the coil 312 for mounting by adhesive 322 within the interior portion of the coil adjacent the body portion 302 of the actuator 300. However, it should be appreciated that a variety of different mounting arrangements of the bobbin 330 within the coil 312 are possible. Also, it should be appreciated that the bobbin 330 may include any number of fins to aid in heat convection from the coil. Further, typically, both the fork 318 and the bobbin 330 may both be comprised of a metallic material to aid in the convection of heat from the coil 312. In one embodiment, the opposed fins 306 and 308 of the bobbin 330 may be formed but of aluminum. Additionally, the opposed fins 306 and 308 of the bobbin 330 may be of any suitable thickness, for example, to aid in mass balancing. For example, in one embodiment, the opposed fins 306 and 308 of the bobbin 330 may be approximately 0.2 mm in thickness.

As previously discussed, there is extreme competitive pressure in the disk drive industry to continually develop hard disk drives that provide for faster access to data. One technique to accomplish this is by increasing the speed at which the actuator 300 of the HSA is pivoted to position the head over a track of the disk in order to access data. However, in order to move the actuator 300 faster, more power needs to be applied to the coil 312 of the coil assembly 310 in order to move the head of the HSA at a faster rate, which results in increased temperatures to the body portion 302 and the arms 304 of the actuator 300 and, of course, to the coil 312 itself. Fortunately, by utilizing a coil assembly 310 having a metallic fork 318 with at least one prong 320 having opposed fins 328 and a bobbin 330 having opposed fins 306 and 308, a great deal of surface area is provided to aid in the convection of heat from the coil such that more power can be applied to the coil while reducing both the temperatures of the coil 312 itself and the actuator 300. Accordingly, the actuator 300 of the HSA can be moved at a faster rate while limiting the potential overheating of the actuator.

In one embodiment, the mass of the bobbin 330 may be approximately equivalent to the amount of mass that is not present in the prong 320 of the fork 318 due to the channel-shaped portion 324 being formed within the prong of the fork. This lowers the inertial mass of the actuator 300 and allows the actuator to operate at a relatively high butterfly or pivot mode frequency (e.g. 7289 hertz). Further, it should be appreciated that the bobbin 330 increases the stiffness of the overall coil assembly 310 and helps to support the coil 312.

Figure 4:
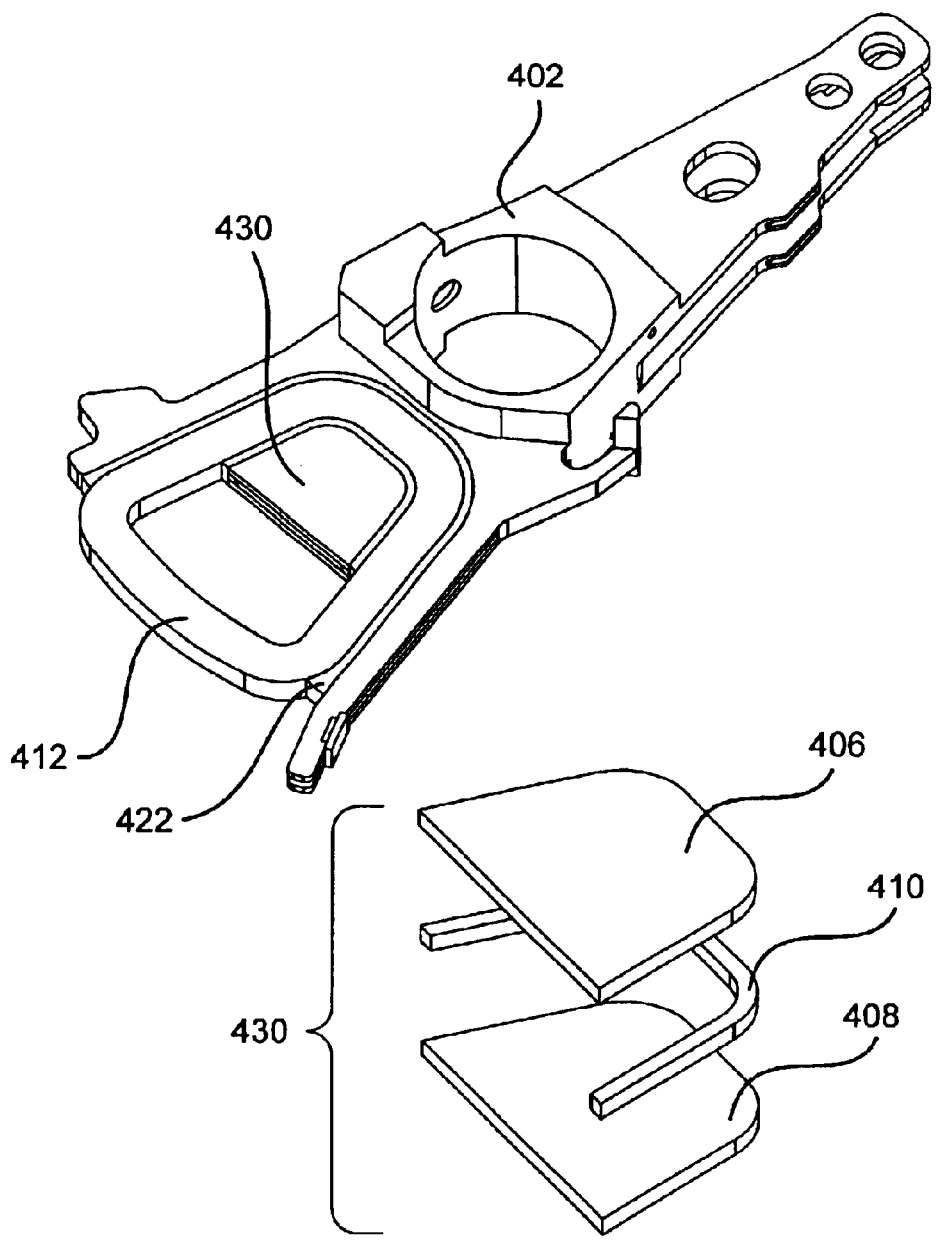
FIG. 4 shows another perspective view of the actuator of FIG. 3, and particularly illustrates a bobbin of the coil assembly having a spacer, according to one embodiment of the invention.

Turning now to FIG. 4, FIG. 4 shows another perspective view of the actuator of FIG. 3, and particularly illustrates a bobbin 430 of the coil assembly having a spacer 410, according to one embodiment of the invention. As previously discussed, the bobbin 430 may include at least two opposed fins 406 and 408 to aid in the convection of heat from the coil 412. As can be seen in FIG. 4, the two opposed fins 406 and 408 are approximately fin-shaped members conforming approximately to a portion of the interior shape of the coil 412 for mounting by adhesive 422 within the interior portion of the coil adjacent the body portion 402 of the actuator 400.

Further, in the embodiment shown in FIG. 4, the two opposed fins 406 and 408 of the bobbin 430 may be separated from one another by an approximately U-shaped spacer 410 that conforms to the outside perimeter of each of the two opposed fins. For example, the spacer 410 may be comprised of a plastic material or a ceramic material. The spacer 410 separates the two opposed fins 406 and 408 from one another to aid in heat convection. Moreover, the spacer 410 may be mounted to the two opposed fins 406 and 408 by adhesive or may be mounted between the opposed fins by other suitable means.

Figure 5:
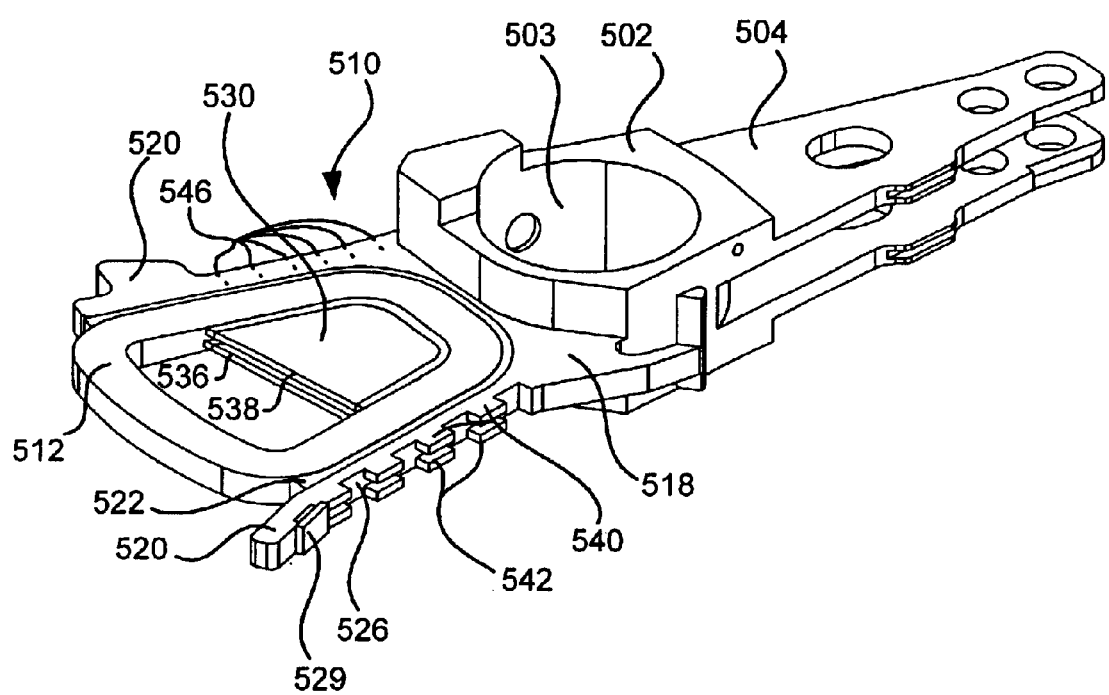
FIG. 5 shows a perspective view of another embodiment of an actuator having a coil assembly designed to aid in heat convection from the coil of the coil assembly, according to one embodiment of the invention.

With reference now to FIG. 5, FIG. 5 shows a perspective view of another embodiment of an actuator 500 having a coil assembly 510 designed to aid in heat convection from the coil of the coil assembly, according to one embodiment of the invention. The actuator 500 is for use with a disk drive, such as the disk drive previously discussed with reference to FIG. 1. The actuator 500 includes a body portion 502 for pivotally coupling to the disk drive and at least one actuator arm 504 cantilevered from the body portion for supporting a HGA (not shown). The body portion 502 includes a pivot bore 503 for receipt of the pivot bearing cartridge that pivotally mounts the actuator 500 and the HSA to the base of the disk drive and further forms a pivot axis about which the HSA can pivot such that the head at the distal end of the HGA may be moved over a recording surface of a disk, as previously discussed with reference FIG. 1.

The actuator 500 further includes a coil assembly 510 having a coil 512 and an approximately U-shaped fork 518. The fork 518 is cantilevered from the body portion 502 in an opposite direction from the actuator arm 504 and includes a pair of opposed prongs 520 that angle slightly outward from the body portion and that mount the coil 512. Particularly, the coil 512 may be mounted to the interior portion of the approximately U-shaped fork 518 between the pair of opposed prongs 520 by a suitable adhesive 522.

At least one of the prongs 520 of the fork 518 includes a plurality of opposed projections 540 and 542 that may be disposed along the sidewall 526 of the prong 520 in order to aid in the convection of heat from the coil 522. In the embodiment shown in FIG. 5, the plurality of opposed projections 540 and 542 may be approximately rectangularly-shaped and may be arranged in columns in order to aid in the convection of heat from the coil 522.

It should be appreciated that either one or both of the prongs 520 may have the plurality of opposed projections 540 and 542. As shown in FIG. 5, dashed lines 546 indicate the presence of a plurality of opposed projections 540 and 542 on the other prong 520. However, in the case, where the other prong 520 does not include opposed projections, the prong may have any suitable solid structure. Moreover, it should be appreciated that any number of opposed projections may be utilized to aid in heat convection. Also, a tang 529 may be provided to interact with a latch of the disk drive in order to latch the actuator of the HSA when the hard disk drive is powered down.

In a more detailed embodiment, the fork 518 may comprise a metallic material. Further, the coil assembly 510 may include a bobbin 530, which may also be comprised of a metallic material. In one particular embodiment, the bobbin may include at least two opposed fins 536 and 538 to aid in the convection of heat from the coil 512. In one embodiment, the fins of the bobbin may be separated from one another by a spacer, as previously discussed with reference to FIG. 4. For example, the spacer may be comprised of a plastic material or a ceramic material.

The bobbin 530 is the same type of bobbin as the bobbin previously discussed with reference to FIGS. 3 and 4, having two opposed fins 536 and 538 that are approximately fin-shaped members conforming approximately to a portion of the interior shape of the coil 512 for mounting by adhesive 522 within the interior portion of the coil adjacent the body portion 502 of the actuator 500. However, it should be appreciated that a variety of different mounting arrangements of the bobbin 530 within the coil 512 are possible. Also, it should be appreciated that the bobbin 530 may include any number of fins to aid in heat convection from the coil. Further, typically, both the fork 518 and the bobbin 530 may both be comprised of a metallic material to aid in the convection of heat from the coil 512. In one embodiment, the opposed fins 536 and 538 of the bobbin 530 may be formed out of aluminum. Additionally, the opposed fins 536 and 538 of the bobbin 530 may be of any suitable thickness, for example, to aid in mass balancing. For example, in one embodiment, the opposed fins 536 and 538 of the bobbin 530 may be approximately 0.2 mm in thickness.

Thus, the actuator 500 having the same type of bobbin as previously discussed with reference to FIGS. 3 and 4, and having a plurality of opposed projections 540 and 542 disposed along the sidewall 526 of one or more of the prongs 520, provides a great deal of surface area to aid in the convection of heat from the coil 512. In this way, more power can be applied to the coil 512 while reducing both the temperatures of the coil 512 itself and the actuator 500. Accordingly, the actuator 500 of the HSA can be moved at a faster rate while limiting the potential overheating of the actuator.

Figure 6:
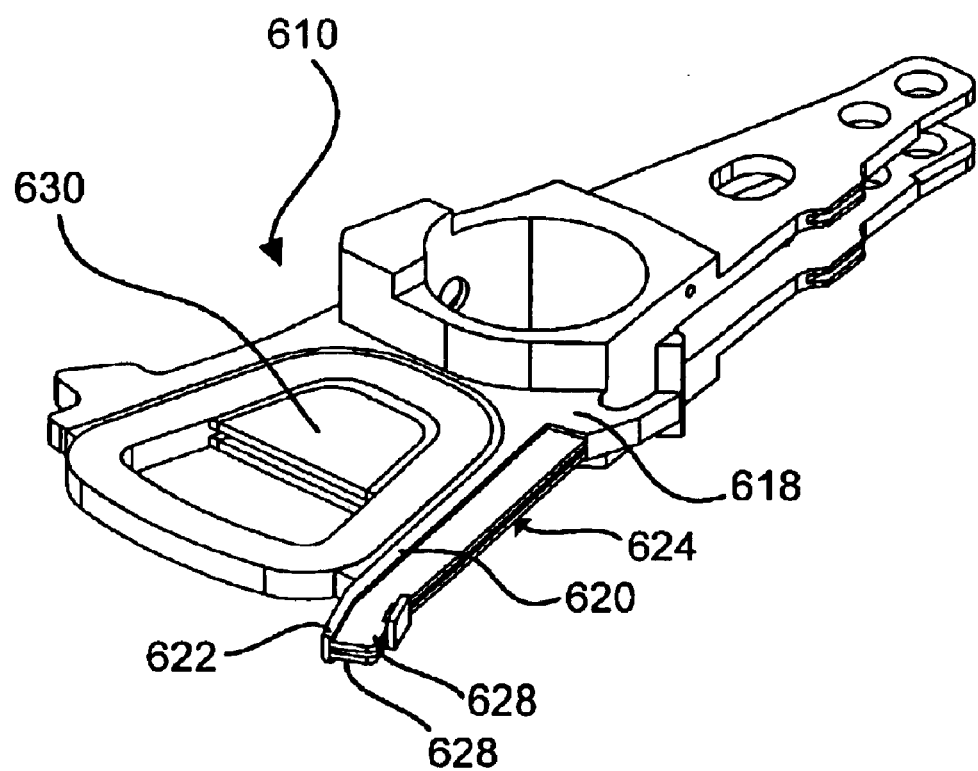
FIG. 6 shows a perspective view of a slightly modified actuator of FIG. 2, according to one embodiment of the invention.

Turning briefly to FIG. 6, FIG. 6 shows a perspective view of a slightly modified actuator of FIG. 2, according to one embodiment of the invention. In the slightly modified actuator 600 of FIG. 6, the at least one prong 620 of the fork 618 of the coil assembly 610 includes a sidewall 622 from which at least two opposed fins 628 project to thereby form a channel-shaped portion 624 to aid in the convection of heat from the coil. Particularly, in one embodiment, the sidewall 622 may extend beyond the at least two opposed fins 628 such that the at least two opposed fins 628 project from an interior portion of the sidewall 622 to form a step and a slightly smaller channel-shaped portion 624 (than that of FIG. 2). It should be appreciated that either one or both of the prongs 620 may have fins 628. In the case, where a prong does not include fins, the prong may be a suitable solid structure.

In most all other aspects, the actuator 600 is constructed and functions in the same way as the actuators previously described with reference to FIGS. 2–5, and therefore, these details will not be repeated for brevity's sake. Furthermore, the bobbin 630 of the actuator 600 is the same as that of FIGS. 2–5, previously described in detail, and therefore the details of the bobbin 630 will also not be repeated for brevity's sake.

Other modifications and embodiments will occur to those of skill in this art and all such modifications and other embodiments are deemed to fall within the scope of the present invention.

We claim:

1. An actuator for use with a disk drive, the actuator comprising:
   a body portion for pivotally coupling to the disk drive;
   an actuator arm cantilevered from the body portion for supporting a head gimbal assembly (HGA); and
   a coil assembly including a coil and a fork, the fork cantilevered from the body portion in an opposite direction from the actuator arm, the fork including a pair of opposed prongs to mount the coil, wherein at least one prong of the fork has at least two opposed fins to aid in the convection of heat from the coil.

2. The actuator of claim 1, further comprising a sidewall from which the at least two opposed fins project thereby forming a channel-shaped portion to aid in the convection of heat from the coil.

3. The actuator of claim 2, wherein the sidewall extends beyond the at least two opposed fins such that the at least two opposed fins project from an interior portion of the sidewall.

4. The actuator of claim 1, wherein the fork comprises a metallic material.

5. The actuator of claim 4, wherein the coil assembly further includes a bobbin.

6. The actuator of claim 5, wherein the bobbin comprises a metallic material.

7. The actuator of claim 6, wherein the bobbin includes at least two opposed fins to aid in the convection of heat from the coil.

8. The actuator of claim 7, wherein the fins of the bobbin are separated from one another by a spacer.

9. The actuator of claim 8, wherein the spacer comprises a plastic material.

10. The actuator of claim 8, wherein the spacer comprises a ceramic material.

11. An actuator for use with a disk drive, the actuator comprising:
    a body portion for pivotally coupling to the disk drive;
    an actuator arm cantilevered from the body portion for supporting a head gimbal assembly (HGA); and
    a coil assembly including a coil and a fork, the fork cantilevered from the body portion in an opposite direction from the actuator arm, the fork including a pair of opposed prongs to mount the coil, wherein at least one prong of the fork has a plurality of opposed projections that are disposed along the prong to aid in the convection of heat from the coil.

12. The actuator of claim 11, wherein the fork comprises a metallic material.

13. The actuator of claim 12, wherein the coil assembly further includes a bobbin.

14. The actuator of claim 13, wherein the bobbin comprises a metallic material.

15. The actuator of claim 14, wherein the bobbin includes at least two opposed fins to aid in the convection of heat from the coil.

16. The actuator of claim 15, wherein the fins of the bobbin are separated, from one another by a spacer.

17. The actuator of claim 16, wherein the spacer comprises a plastic material.

18. The actuator of claim 16, wherein the spacer comprises a ceramic material.

19. A disk drive comprising:
    a disk for rotation within the disk drive;
    a head stack assembly (HSA) having a body portion pivotally coupled to the disk drive and an actuator arm cantilevered from the body portion to support a head gimbal assembly (HGA) having a head for writing and reading data to and from the disk; and a coil assembly including a coil and a fork, the fork cantilevered from the body portion in an opposite direction from the actuator arm, the fork including a pair of opposed prongs to mount the coil, wherein at least one prong of the fork has at least two opposed fins to aid in the convection of heat from the coil.

20. The disk drive of claim 19, further comprising a sidewall from which the at least two opposed fins project thereby forming a channel-shaped portion to aid in the convection of heat from the coil.

21. The disk drive of claim 20, wherein the sidewall extends beyond the at least two opposed fins such that the at least two opposed fins project from an interior portion of the sidewall.

22. The disk drive of claim 19, wherein the fork comprises a metallic material.

23. The disk drive of claim 22, wherein the coil assembly further includes a bobbin.

24. The disk drive of claim 23, wherein the bobbin comprises a metallic material.

25. The disk drive of claim 24, wherein the bobbin includes at least two opposed fins to aid in the convection of heat from the coil.

26. The disk drive of claim 25, wherein the fins of the bobbin are separated from one another by a spacer.

27. The disk drive of claim 26, wherein the spacer comprises a plastic material.

28. The disk drive of claim 26, wherein the spacer comprises a ceramic material.

29. A disk drive comprising:

a disk for rotation within the disk drive;

a head stack assembly (HSA) having a body portion pivotally coupled to the disk drive and an actuator arm cantilevered from the body portion to support a head gimbal assembly (HGA) having a head for writing and reading data to and from the disk; and a coil assembly including a coil and a fork, the fork cantilevered from the body portion in an opposite direction from the actuator arm, the fork including a pair of opposed prongs to mount the coil, wherein at least one prong of the fork has a plurality of opposed projections that are disposed along the prong to aid in the convection of heat from the coil.

30. The disk drive of claim 29, wherein the fork comprises a metallic material.

31. The disk drive of claim 30, wherein the coil assembly further includes a bobbin.

32. The disk drive of claim 31, wherein the bobbin comprises a metallic material.

33. The disk drive of claim 32, wherein the bobbin includes at least two opposed fins to aid in the convection of heat from the coil.

34. The disk drive of claim 33, wherein the fins of the bobbin are separated from one another by a spacer.

35. The disk drive of claim 34, wherein the spacer comprises a plastic material.

36. The disk drive of claim 34, wherein the spacer comprises a ceramic material.

* * * * *